United States Patent
Dunagan et al.

(10) Patent No.: US 8,275,646 B2
(45) Date of Patent: Sep. 25, 2012

(54) INTELLECTUAL PROPERTY ASSESSMENTS BASED ON COMPONENT BUSINESS MODELS

(75) Inventors: Deborah L. Dunagan, Gainesville, GA (US); Rick A. Hamilton, II, Charlottesville, VA (US); Brian M. O'Connell, RTP, NC (US); Arvin Patel, Sunnyvale, CA (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 12/499,289

(22) Filed: Jul. 8, 2009

(65) Prior Publication Data
US 2011/0010309 A1    Jan. 13, 2011

(51) Int. Cl.
G06F 17/30    (2006.01)
(52) U.S. Cl. ..................................... 705/7.11
(58) Field of Classification Search ................... 705/7.11
See application file for complete search history.

(56) References Cited

U.S. PATENT DOCUMENTS

| | | | |
|---|---|---|---|
| 5,999,907 A | 12/1999 | Donner | |
| 6,154,725 A | 11/2000 | Donner | |
| 6,308,164 B1 | 10/2001 | Nummelin et al. | |
| 6,556,992 B1 | 4/2003 | Barney et al. | |
| 7,089,192 B2 | 8/2006 | Bracchitta et al. | |
| 7,194,691 B1 | 3/2007 | Zilka et al. | |
| 7,386,460 B1 | 6/2008 | Frank et al. | |
| 7,493,262 B2 | 2/2009 | Hagelin | |
| 7,516,137 B1 | 4/2009 | Earle et al. | |
| 2002/0082973 A1* | 6/2002 | Marbach et al. | 705/37 |
| 2002/0107698 A1 | 8/2002 | Brown et al. | |
| 2003/0036945 A1* | 2/2003 | Del Vecchio et al. | 705/10 |
| 2003/0036947 A1 | 2/2003 | Smith et al. | |
| 2004/0054545 A1* | 3/2004 | Knight | 705/1 |
| 2004/0093244 A1* | 5/2004 | Hatcher et al. | 705/7 |

(Continued)

FOREIGN PATENT DOCUMENTS
WO    WO 0102987 A2    1/2001

OTHER PUBLICATIONS

WebRegMT Overview, European Patent Register [online], [retrieved on May 18, 2009-]. Retrieved from the Internet Archive Wayback Machine using <URL: http://web.archive.org> and <URL: http://web.archive.org/web/*/http://docs.epoline.org/doc/epoline/myepoline/en/WebRegMT_Help_EN.htm>.

(Continued)

Primary Examiner — Romain Jeanty
(74) Attorney, Agent, or Firm — Cahn & Samuels, LLP

(57) ABSTRACT

An embodiment of the invention provides a method for IP assessment based on a component business model (CBM). The method assesses components in the CBM via a component assessment module, which interrogates an entity (e.g., a user, a third party consultant, and an information database) with questions. Output (including answers to the questions) from the component assessment module is sent to a component detection module. Scores (e.g., numerical scores and/or low, medium, or high scores) are assigned to the components via the component detection module based on the output from the component assessment module. The output from the component assessment module and/or the scores are analyzed to determine whether a gap, a duplication, a conflict, and/or an over-investment exists in at least one of the components.

25 Claims, 9 Drawing Sheets

U.S. PATENT DOCUMENTS

| | | |
|---|---|---|
| 2005/0138070 A1* | 6/2005 | Huberman et al. ........ 707/104.1 |
| 2005/0149401 A1 | 7/2005 | Ratcliffe et al. |
| 2005/0154673 A1 | 7/2005 | Fellenstein et al. |
| 2006/0031092 A1 | 2/2006 | Cronin |
| 2006/0080136 A1 | 4/2006 | Frank et al. |
| 2008/0243889 A1 | 10/2008 | Chen et al. |
| 2009/0313207 A1 | 12/2009 | Boss et al. |
| 2010/0332285 A1 | 12/2010 | Dunagan et al. |

OTHER PUBLICATIONS

Business Insights Workbench, International Business Machines Corporation [online], [retrieved on May 18, 2009]. Retrieved from the Internet using <URL: http://www.almaden.ibm.com/asr/projects/biw/biw-index.shtml>.

* cited by examiner

| | 100 | Strategic Planning 200 | Invent 300 | IP Creation 400 | IP Administration 500 |
|---|---|---|---|---|---|
| Direct 910 | | Innovation strategy 210 | Portfolio strategy 310 | Filing strategy 410 | Budgeting 510 |
| | | IP strategy 212 | | | Planning & forecasting 512 |
| | | Business unit strategy 214 | | | |
| | | Technology strategy 216 | | IP creation 412 | Policy setting 514 |
| | | R&D strategy 218 | | | |
| Control 920 | | Market priority alignment 220 | R&D budget allocation 320 | External associate management 420 | Patent quality management 520 |
| | | Technology priority alignment 222 | Invention target setting 322 | Performance measurement 422 | |
| | | R&D priority alignment 224 | Performance measurement 324 | Invention evaluation 424 | Portfolio management 522 |
| | | | Inventor training 326 | IP valuation 426 | Performance measurement 524 |
| Execute 930 | | Competitive intelligence 230 | Invention mining 330 | Patent creation 430 | Asset extension 530 |
| | | Regulatory & legal monitoring 232 | Invention workshops 332 | Publication 432 | Asset maintenance 532 |
| | | | Invention disclosure 334 | Trade secret protection 434 | |
| | | Technology monitoring 234 | Inventor incentives 336 | | Asset retirement 534 |
| | | IP landscaping 236 | | Trademark creation 436 | |

FIG. 1A

| 100 | Defend 600 | Influence 700 | Capitalize 800 |
|---|---|---|---|
| Direct 910 | Freedom of action policy setting 610 | Standards strategy 710 | Target/priority setting 810 |
| | | Open innovation strategy 712 | |
| | Risk management 612 | Legal/regulatory strategy 714 | Licensing policies 812 |
| Control 920 | Defense priority setting 620 | Priority setting 720 | Forecasting & budgeting 820 |
| | Performance measurement 622 | Performance measurement 722 | Performance measurement 822 |
| Execute 930 | Adversely held patent monitoring 630 | Asset donation 730 | ID marketable clusters 830 |
| | Patent invalidation 632 | Open innovation 732 | Identify potential customer 832 |
| | Infringement determination 634 | Standards participation 734 | Value proposition development 834 |
| | Defensive leverage creation 636 | Legal/regulatory intervention 736 | Negotiate license/assignment 836 |
| | Licensing negotiation 638 | | |

FIG. 1B

| Innovation Strategy 210 | IP Strategy 212 | Business Unit Strategy 214 | Technology Strategy 216 | R&D Strategy 218 | Activities |
|---|---|---|---|---|---|
| Low Score 1130 | | | | | Innovation strategy is linked to IP strategy |
| Low Score 1130 | | | | | Innovation strategy leverages IP landscape analysis with focus on white space identification and freedom of action |
| Medium Score 1120 | | | | | Company has metrics to measure innovation |
| | Medium Score 1120 | | | | BU strategy is linked to IP strategy |
| | | Medium Score 1120 | | | BU strategy is linked to IP strategy |
| | | | Low Score 1130 | | Technology strategy is linked to IP strategy |
| | | | | Medium Score 1120 | R&D strategy leverages IP landscape analysis with focus on white space identification and freedom of action |
| | | | | | Market priority alignment is linked to Innovation strategy |
| | | High Score 1110 | | High Score 1110 | Market priority alignment is linked to IP strategy |

INTELLECTUAL PROPERTY ASSESSMENTS BASED ON COMPONENT BUSINESS MODELS

I. FIELD OF THE INVENTION

The present invention is in the field of systems, methods, and computer program products for intellectual property assessments based on component business models.

II. BACKGROUND OF THE INVENTION

Intellectual property (IP) is a legal field that refers to creations of the mind, such as musical, literary, and artistic works; inventions; and, symbols, names, images, and designs used in commerce. IP includes, among other things, copyrights, trademarks, patents, and related rights. Under IP law, the holder of one these "properties" has certain rights to the creative work, commercial symbol, or invention that is covered by it. IP confers a bundle of rights in relation to the particular form or manner in which ideas or information is expressed or manifested, and not in relation to the ideas or concepts themselves (the idea-expression divide). The term "intellectual property" denotes the specific legal rights which authors, inventors, and other IP holders may hold and exercise, and not the intellectual work itself.

III. SUMMARY OF THE INVENTION

An embodiment of the invention provides a method of IP assessment based on a component business model (CBM). The method assesses components in the CBM via a component assessment module, which interrogates an entity (e.g., a user, a third party consultant, and an information database) with questions. Output (including answers to the questions) from the component assessment module is sent to a component detection module. Scores (e.g., numerical scores and/or low, medium, or high scores) are assigned to the components via the component detection module based on the output from the component assessment module.

The output from the component assessment module and/or the scores are analyzed to determine whether a gap, a duplication, a conflict, and/or an over-investment exists in at least one of the components. The gap indicates that one or more of the following conditions exists in a component: lacks a capability, lacks a functionality, suffers from a poor design of a functionality, and is misaligned with a strategy of the CBM. Duplication indicates that a component includes a duplicate effort respective to a second component in the CBM in the development, maintenance, and/or production of IP services. The conflict indicates that a component includes a functionality that reduces the functionality of a second component in the CBM. Over-investment indicates that a component includes diminishing returns respective to an overall goal of the CBM.

Output from the component detection module is sent to a transformation planning module, wherein the output includes the scores and/or the gap, duplication, conflict, and/or over-investment. A table is created via the transformation planning module based on the output from the component detection module. The table displays the components and the gap, duplication, conflict, and/or over-investment. A chart is created via the transformation planning module based on the output from the component detection module. The chart includes the components and the scores.

The method further includes grouping the components into stages (e.g., invent stage, IP creation stage, IP administration stage, defend stage, influence stage, and capitalize stage) and assigning second scores (e.g., numerical scores and/or low, medium, or high scores) to the stages based on the scores to the components. A second chart is created that includes the stages and the second scores.

Another embodiment of the invention provides a system for IP assessment based on a CBM, including a component assessment module, a component detection module, and a transformation planning module. The component assessment module assesses components in the CBM. The component assessment module includes an interrogation unit for interrogating an entity (e.g., a user, a third party consultant, and/or an information database) with questions.

The component detection module receives output (including answers to the questions) from the component assessment module and includes a scoring unit and an analyzer. The scoring unit assigns scores (e.g., numerical scores and/or low, medium, or high scores) to the components based on the output from the component assessment module. The analyzer determines whether a gap, a duplication, a conflict, and an over-investment exists in at least one component based on the output from the component assessment module and/or the scores.

The gap indicates that at least one of the following conditions exists in a component: lacks a capability, lacks a functionality, suffers from a poor design of a functionality, and is misaligned with a strategy of the CBM. Duplication indicates that a component includes a duplicate effort respective to a second component in the CBM in the development, maintenance, and/or production of IP services. The conflict indicates that a component includes a functionality that reduces a functionality of a second component in the CBM. Over-investment indicates that a component includes diminishing returns respective to an overall goal of the CBM.

The transformation planning module receives output from the component detection module, wherein the output includes the scores and/or the gap, duplication, conflict, and/or the over-investment. A table is created by the transformation planning module based on the output from the component detection module. The table displays the components and the gap, duplication, conflict, and/or over-investment. A chart is created by the transformation planning module based on the output from the component detection module. The chart includes the components and the scores.

The transformation planning module groups the components into stages (e.g., invent stage, IP creation stage, IP administration stage, defend stage, influence stage, and capitalize stage) and assigns second scores (e.g., numerical scores and/or low, medium, or high scores) to the stages based on the scores of the components. The transformation planning module creates a second chart including the stages and the second scores.

IV. BRIEF DESCRIPTION OF THE DRAWINGS

The present invention is described with reference to the accompanying drawings. In the drawings, like reference numbers indicate identical or functionally similar elements.

FIGS. 1A-1B illustrate a component business model according to an embodiment of the invention;

FIG. 4 illustrates the components of the Strategic Planning operational process according to an embodiment of the invention;

V. DETAILED DESCRIPTION OF THE DRAWINGS

Figure 2:
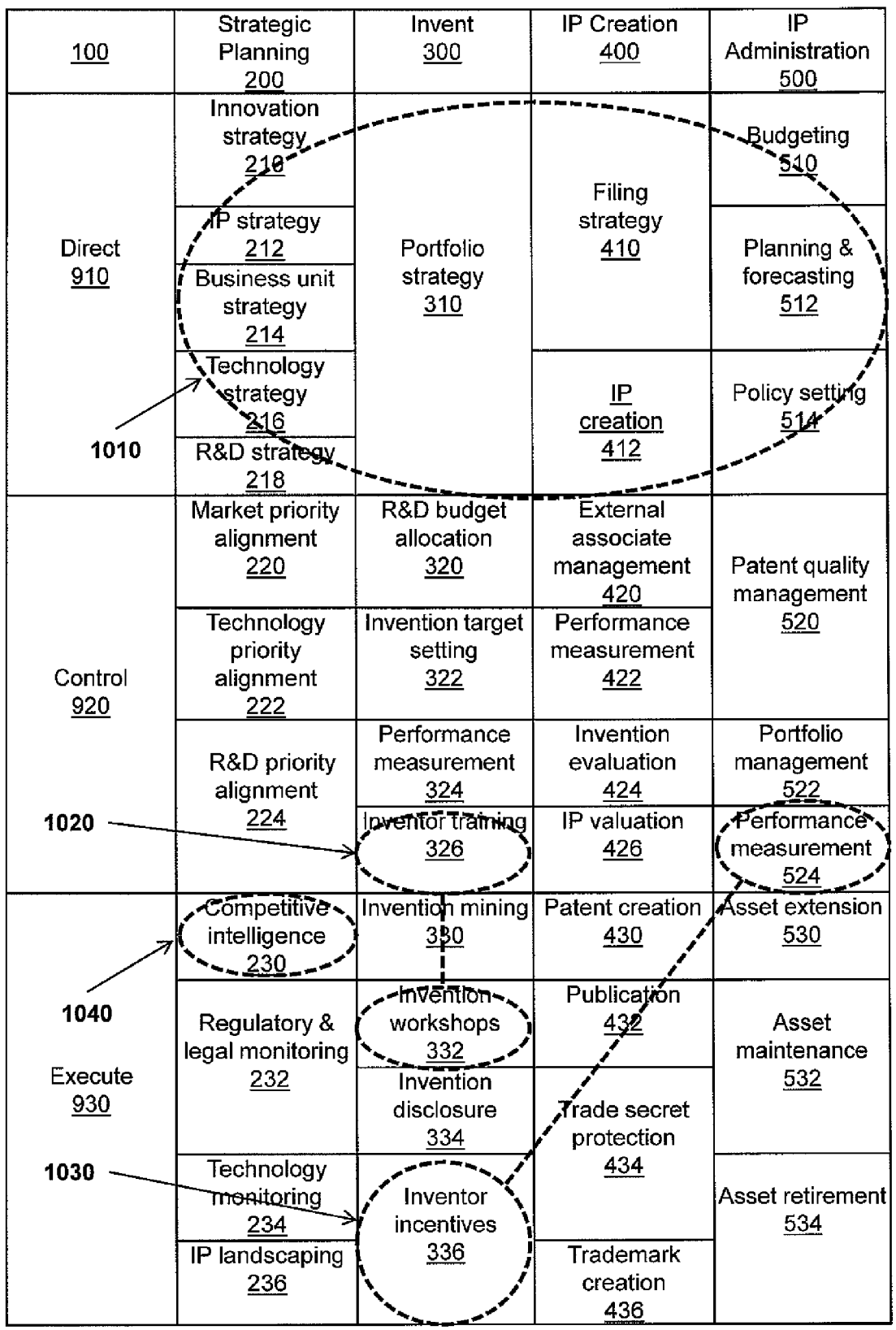
FIG. 2 illustrates a gap, duplication, conflicts, and over-investment according to an embodiment of the invention.

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention provides client services, including the building, leveraging, and architecting of IP solutions. Methods are provided to assess a client organization's IP stature and provide detailed steps to enable the organization to plan for and to reach higher levels of IP maturity and capability. The methods herein clearly lay out the ingredients or building blocks of a comprehensive IP business architecture, thereby avoiding overlapping and inefficient business systems that typically result when IP solutions are built with the narrow perspective of one single process improvement after another and with no integration across the field.

An embodiment of the invention provides systems, methods, and computer program products for intellectual property assessments based on a component business model (CBM). The CBM defines the capabilities that a client organization utilizes in order to effectively manage its IP business. Each capability is a service that the client organization utilizes in order to achieve its IP management mission from invention harvesting to capitalization. The components of the CBM provide the capabilities of the client organization. In other words, the components are the design elements in the CBM; and, the capabilities are the functions of the components. The CBM allows client organizations to operationalize and build cohesive modules around each component and to integrate across multiple components, i.e., have the components work together as an integrated system.

FIGS. 1A-1B illustrate a CBM 100 according to one embodiment of the invention. The CBM 100 includes components 210-836, which are grouped into a Strategic Planning operational process 200, an Invent operational process 300, an IP Creation operational process 400, an IP Administration operational process 500, a Defend operational process 600, an Influence operational process 700, and a Capitalize operational process 800. Within each operational process 200-800, the components 210-836 are further categorized into a Direct operation role, responsibility, and function (ORRF) 910, a Control ORRF 920, or a Execute ORRF 930. Although FIGS. 1A-1B illustrate a CBM 100 having 7 operational processes 200-800 (i.e., columns) and 3 operational roles, responsibilities, and functions 910-930 (i.e., rows), in an alternative embodiment, operational processes and/or operational roles, responsibilities, and functions are added to and/or removed from the CBM 100. For example, in one embodiment, the CBM 100 could lack the Influence operational process 700.

The ORRF's 910-930 define the operational roles, responsibilities, and functions of the system. They are supported by the operational processes 200-800. For example, if an employee has an operational role, responsibility, and function to "direct" a portfolio strategy, then the portfolio strategy component 310 provides the associated processes to support this task, as described more fully below. Each of the components 210-836 includes specific processes, tools, and methodologies to be performed by people for enabling the capabilities of the component. In another example, if a group of employees have an operational role, responsibility, and function to "execute" asset retirement, then the asset retirement component 534 provides the associated processes, people and/or tools to support this task, as described more fully below.

The ability to direct, control and execute allows the components 210-836 and ORRF's 910-930 to function independently, in a defined aggregate, in relationship with one another. Thus, in directing the IP capabilities, a client organization is also able to control and execute for the intended value realization of the IP system and the capabilities defined in the design. For example, if an organizational function is to direct the development of a portfolio strategy (Direct ORRF 910 and component 310), one way that the strategy can be enabled is to control the R&D budget allocation (Control ORRF 920 and component 320) and to execute invention workshops on that strategy (Execute ORRF 930 and component 332), which is funded by the R&D budget allocation component 320. Thus, the portfolio strategy component 310 is interlocked with the innovation strategy component 210, the IP strategy component 212, the business unit strategy component 214, the technology strategy component 216, and the R&D strategy component 218. In this instance, understanding gaps and conflicts enables the strategies to be controlled and executed and redirected as needed.

The components 210-236 in the Strategic Planning operational process 200 provide the capability to plan the client organization's course of action for IP. In order for the organization to work as an integrated whole, multiple strategic areas of the organization are aligned, and information to formulate business strategies is obtained. In at least one embodiment of the invention, the Strategic Planning operational process 200 includes an innovation strategy component 210, an IP strategy component 212, a business unit strategy component 214, a technology strategy component 216, a research and development (R&D) strategy component 218, a market priority alignment component 220, a technology priority alignment component 222, a R&D priority alignment component 224, a competitive intelligence component 230, a regulatory & legal monitoring component 232, a technology monitoring component 234, and an IP landscaping component 236. Although FIG. 1A illustrates that the Strategic Planning operational process 200 includes components 210, 212, 214, 216, 218, 220, 222, 224, 230, 232, 234, and 236, in an alternative embodiment, components are added to and/or removed from the Strategic Planning operational process 200.

The components 310-336 in the Invent operational process 300 provide the capability to sense and respond to opportunities and threats through leveraging and managing inventions for a business advantage. As described below, this includes portfolio strategies, target setting, and the ability to incent and sustain the skills and capabilities to be utilized. The components 310-336 utilize the processes, people and/or tools of the CBM 100 to ensure that a rich IP portfolio is defined and managed, and that the resources are trained and incented to support the strategy. In at least one embodiment of the invention, the Invent operational process 300 includes a portfolio strategy component 310, an R&D budget allocation strategy component 320, an invention target setting component 322, a performance measurement component 324, an inventor training component 326, an invention mining component 330, an invention workshops component 332, an invention disclosure component 334, and an inventor incentives component 336. Although FIG. 1A illustrates that the Invent operational process 300 includes components 310, 320, 322, 324, 326, 330, 332, 334, and 336, in an alternative embodiment, components are added to and/or removed from the Invent operational process 300.

The components 410-436 in the IP Creation operational process 400 provide the capability to create, value, and protect IP for a business advantage. This is based on the defined needs of the business and on the legally defined areas of patent, trademark, trade secret, and copyright. The IP Creation operational process protects the client organization against IP leakage. In at least one embodiment of the invention, the IP Creation operational process 400 includes a filing strategy component 410, an IP creation target setting component 412, an external associate management component 420, a performance measurement component 422, an invention evaluation component 424, an IP valuation component 426, a patent creation component 430, a publication component 432, a trade secret component 434, and a trademark creation component 436. Although FIG. 1A illustrates that the IP Creation operational process 400 includes components 410, 412, 420, 422, 424, 426, 430, 432, 434, and 436, in an alternative embodiment, components are added to and/or removed from the IP Creation operational process 400.

The components 510-534 in the IP Administration operational process 500 provide the capability to support the IP function (e.g., budgeting, policies, processes, procedures, roles and responsibilities, and defined performance metrics) utilized by the IP system to enable execution of the IP strategies and the performance of IP capabilities defined by the client organization. In at least one embodiment, the IP Administration operational process 500 includes a budgeting component 510, a planning & forecasting component 512, a policy setting component 514, a patent quality management component 520, a portfolio budgeting component 522, a performance measurement component 524, an asset extension component 530, an asset maintenance component 532, and an asset retirement component 534. Although FIG. 1A illustrates that the IP Administration operational process 500 includes components 510, 512, 514, 520, 522, 524, 530, 532, and 534, in an alternative embodiment, components are added to and/or removed from the IP Administration operational process 500.

The components 600-638 in the Defend operational process 600 provide the capability to protect and defend against infringements and invalidations of patents, as well as the capability to negotiate licenses for business advantage and cross licenses for business benefit. This ensures that the client organization is utilizing legal advice, expertise, and strategies to protect its IP interests and is monitoring market and competitor actions to develop risk management approaches and plans. In at least one embodiment, the Defend operational process 600 includes a freedom of action policy setting component 610, a risk management component 612, a defense priority setting component 620, a performance measurement component 622, an adversely held patent monitoring component 630, a patent invalidation component 632, an infringement determination component 634, a defensive leverage creation component 636, and a licensing negotiation component 638. Although FIG. 1B illustrates that the Defend operational process 600 includes components 610, 612, 620, 622, 630, 632, 634, 636, and 638, in an alternative embodiment, components are added to and/or removed from the Defend operational process 600.

The components 710-736 in the Influence operational process 700 provide the capability to influence standards, legal and regulatory decisions, and policies. As described below, this enables innovation across the enterprise and ensures the effective usage of standards for business advantage, including the sharing, protecting, and leveraging of IP. In at least one embodiment, the Influence operational process 700 includes a standards strategy component 710, an open innovation strategy component 712, a legal/regulatory strategy component 714, a priority setting component 720, a performance measurement component 722, an asset donation component 730, an open innovation component 732, a standards participation component 734, and a legal/regulatory intervention component 736. Although FIG. 1B illustrates that the Influence operational process 700 includes components 710, 712, 714, 720, 722, 730, 732, 734, and 736, in an alternative embodiment, components are added to and/or removed from the Influence operational process 700.

The components 810-836 in the Capitalize operational process 800 provide the capability to leverage and exploit IP for business advantage. This includes licensing to generate financial benefits and to inhibit competitor encroachment. In at least one embodiment, the Capitalize operational process 800 includes a target/priority setting component 810, a licensing policies component 812, a forecasting & budgeting component 820, a performance measurement component 822, an ID marketable clusters component 830, an identify potential customers component 832, a value proposition development component 834, and a negotiate license/assignment component 836. Although FIG. 1B illustrates that the Capitalize operational process 800 includes components 810, 812, 820, 822, 830, 832, 834, and 836, in an alternative embodiment, components are added to and/or removed from the Capitalize operational process 800.

An embodiment of the invention provides IP assessment methods for automatically identifying gaps, duplication, conflicts, and over-investment among components 210-836 of the CBM 100. An output of a method provides heatmaps that facilitate a transformation plan to solve the gaps, duplication, conflicts, and over-investment. The CBM 100 provides a standardized and repeatable approach across an organization in order to design an IP system that strategically manages ideas, opportunities, and threats, and enables learning, innovation, and exploitation of ideas. Methods herein use the CBM 100 to assess the current state of IP capabilities and identify gaps, duplication, conflicts, and over-investment. Action plans can be developed that reach or sustain a desired performance level for one or more of the components 210-836. The progress of IP system capabilities are tracked so that the appropriate funding and performance planning can take place.

As illustrated in FIG. 2, an embodiment of the invention detects four issues: gaps 1010, duplication 1020, conflicts 1030, and over-investment 1040. The gaps 1010 indicate that one or more of the components 210-836 are missing one or more criteria. For instance, a component 210-836 may lack a capability, lack a key functionality, and/or suffer from a poor design of an existing functionality. Moreover, a component 210-836 may be misaligned with a strategy and/or may not be supported by measures or the IP culture. The embodiment illustrated in FIG. 2 identifies gaps 1010 in the direction of: strategic planning in the business unit strategy component 214, invention in the portfolio strategy component 310, IP creation in the filing strategy component 410 and the IP creation target setting component 412, and IP administration in the planning and forecasting component 512.

Duplication 1020 identifies multiple components 210-836 that include duplicate efforts in the development, maintenance, and production of IP services. This adds unnecessary complexity, cost, and inefficiencies. In the embodiment illustrated in FIG. 2, duplication 1020 is identified between efforts in the control of invention in the inventor training component 326 and in execution of invention in the invention workshops component 332. In another embodiment, if an organization is developing and conducting IP training in multiple divisions, then the organization is duplicating that work. Thus, the organization as a whole is paying more money for the same development, maintenance, and up keep of the IP training. In yet another embodiment, the licensing or development of various tools and/or processes is duplicated.

Conflicts 1030 identify a component 210-836 having a functionality that reduces the functionality of one or more other components 210-836. In one embodiment, an organization that maintains separate IP training programs in various divisions (e.g., the control of invention in the inventor training component 326 and the execution of invention in the invention workshops component 332) has a conflict if the overall money spent reduces the budget in other components 210-836. Similarly, if the same resource within the organization is tasked with maintaining the tooling for multiple IP training programs, their schedule or quality may be impacted when work is required for more than one IP training program at a time.

Over-investment 1040 identifies one or more components 210-836 that requires an ongoing investment or a planned investment that will result in an overall decline in the goals for the IP program. As discussed above, gaps 1010 between components 210-836 may be disadvantageous; similarly, it is disadvantageous to have a component 210-836 that is too complete (over-invested). It is counter-productive to improve a component 210-836 and/or fill a gap 1040 if doing so would diminish the attainment of the overall goal of maximizing rewards (e.g., profit, protection, competitor attack, publicity). Specifically, there are diminishing returns to an investment in any given component 210-836. At a calculable point, an organization no longer receives the benefit per dollar spent that earlier investments led to. There is a point at which investing an extra dollar results in diminished returns, e.g., an organization spends $100,000 to improve competitive intelligence while only receiving $50,000 of additional value).

In at least one embodiment, both current implementations and planned improvements are monitored for over-investment 1040. Current implementations include recurring operational expenses, e.g., an organization has a policy of paying for a market research tool subscription for inventors that have contributed to an invention disclosure. Planned improvements include investing to fill gaps 1010 and/or making one or more components 210-836 stronger.

Figure 3:
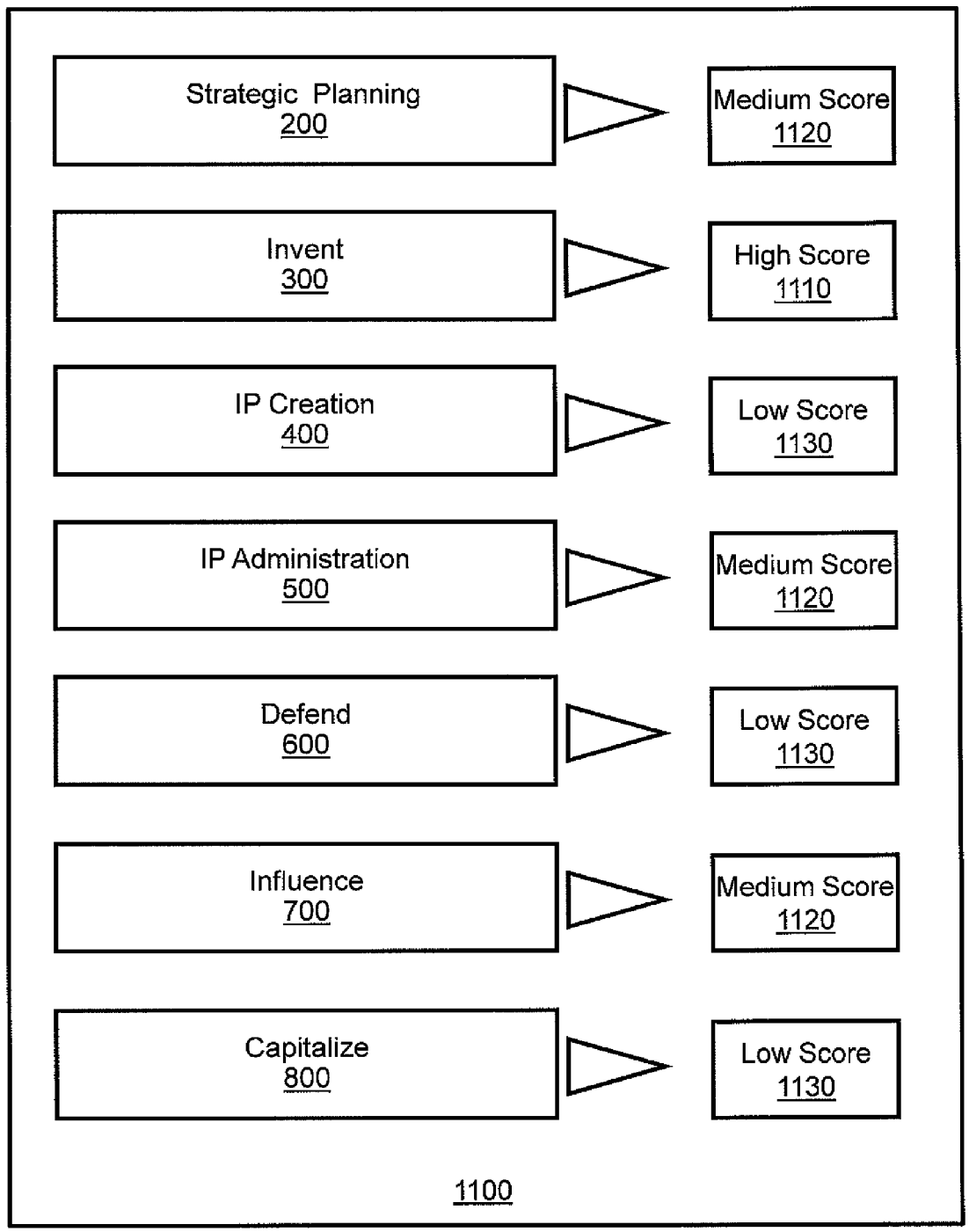
FIG. 3 illustrates a high level heatmap according to an embodiment of the invention.

In at least one embodiment, once the components 210-836 are assessed, the operational processes 200-800 of the CBM 100 are expressed in a high level heatmap (also referred to herein as a "table"), which communicates the performance or lack thereof of the capabilities of the components 210-836. According to one embodiment of the invention, FIG. 3 illustrates a high level heatmap 1100 that is utilized to create a transformation plan and/or road map to address the gaps 1010, duplication 1020, conflicts 1030, and/or over-investment 1040. More specifically, each of the operational processes 200-800 is scored with either a high score 1110, a medium score 1120, or a low score 1130. The high score 1110 indicates that the components 210-836 within the respective operational process 200-800 provide good support for some portion of the capabilities and provide a foundation for an expanded role to support the full needs of the IP system. In the embodiment illustrated in FIG. 3, the Invent operational processes 300 has the high score 1110.

The medium score 1120 indicates that the components 210-836 within the respective operational process 200-800 fulfill a role for part of the needs, but are constrained as a foundation for expansion to meet all of the needs of the IP system. In the embodiment illustrated in FIG. 3, the Strategic Planning operational process 200, the IP Administration operational process 500, and the Influence operational process 700 each have the medium score 1120. The low score 1130 indicates that the components 210-836 within the respective operational process 200-800 represent a significant constraint on the IP capabilities and exposes the organization to risks. In the embodiment illustrated in FIG. 3, the IP Creation operational process 400, the Defend operational process 600, and the Capitalize operational process 800 each have the low score 1130.

The high level heatmap 1100 is further broken down by each individual operational process 200-800. The high level heatmap 1100 can also be broken down by each individual ORRF 910-930. For example, FIG. 4 illustrates a heatmap 1200 (also referred to herein as a "chart") according to one embodiment of the invention. The heatmap 1200 includes the components 210-218 of the Strategic Planning operational process 200 in the Direct ORRF 910. The innovation strategy component 210 has low scores 1130 because of weaknesses in the following capabilities: innovation strategy is linked to the IP strategy; and, the innovation strategy leverages the IP landscape analysis with a focus on white space identification and freedom of action. The innovation strategy component 210 also has a medium score 1120 for the capability: the organization has metrics to measure innovation.

Furthermore, the IP strategy component 212 has a medium score 1120 for the capability: BU strategy is linked to the IP strategy. The BU strategy component 214 has a medium score 1120 for the capability: BU strategy leverages the IP landscape analysis with a focus on white space identification and freedom of action, and a high score 1110 for the capability: Market priority alignment is linked to IP strategy. The technology strategy component 216 has a low score 1130 for the capability: technology strategy is linked to IP strategy. The R&D strategy component 218 has a medium score 1120 for the capability: R&D strategy leverages the IP landscape analysis with a focus on white space identification and freedom of action, and a high score 1110 for the capability: Market priority alignment is linked to IP strategy.

Figure 5:
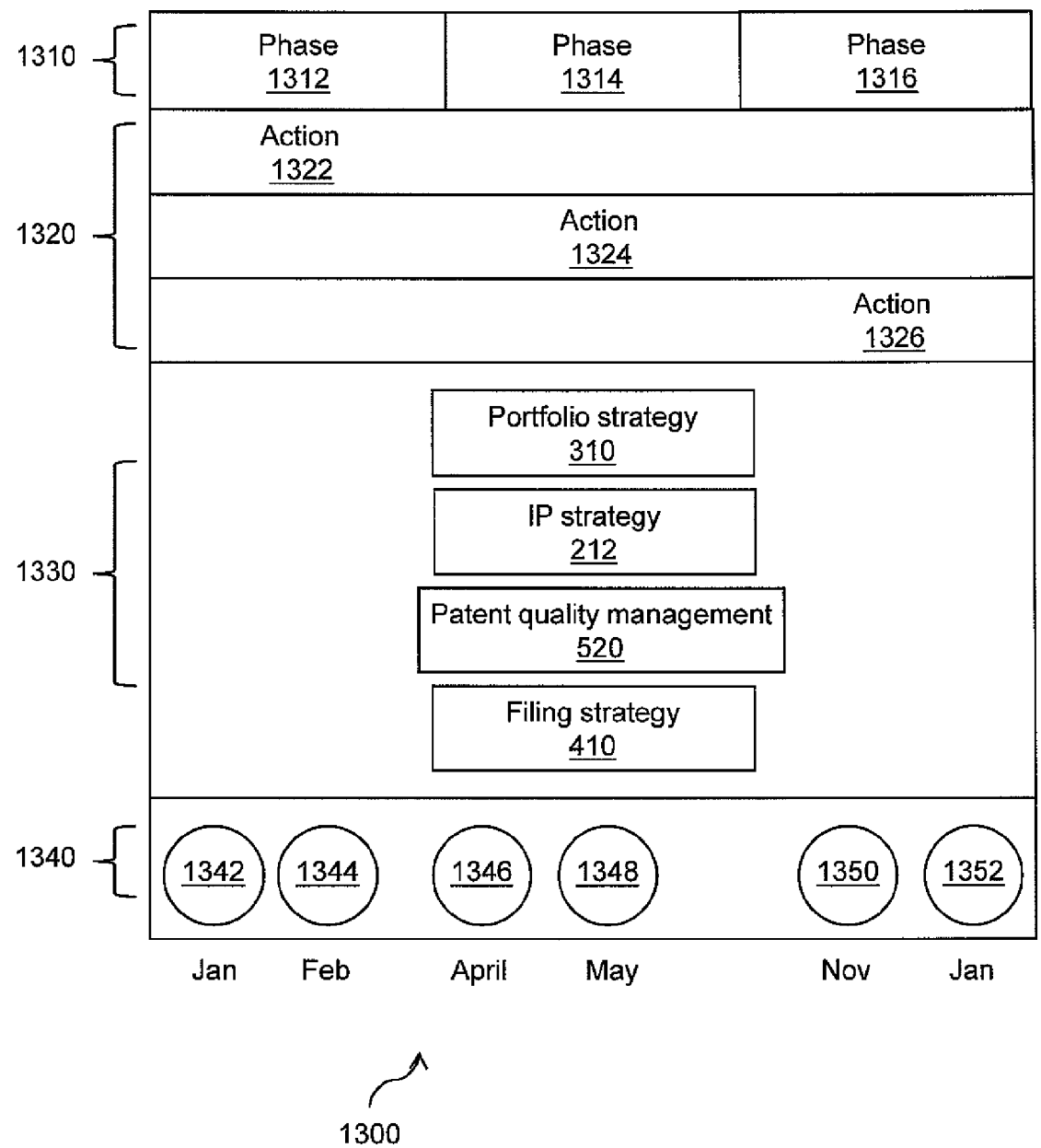
FIG. 5 illustrates a transformation plan according to an embodiment of the invention.

Once the components 210-836 are assessed and scored and/or mapped, a transformation plan is created for implementing changes to the components 210-836. According to an embodiment of the invention, FIG. 5 illustrates a high level view of a transformation plan 1300. In another embodiment, detailed views of the transformation plan include mapping recommendations from the assessment to governance, human resource alignment, processes, and systems.

In one embodiment of the invention, the transformation plan 1300 includes phases 1310, actions 1320, scope 1330, and milestones 1340. The transformation plan 1300 prioritizes and sequences actions to the components 210-836 for purposes of building capabilities in those components that will provide the greatest impact needed and is specific to the needs of the client organization. The transformation plan 1300 is configured and reconfigured per assessment. The assessment provides the analysis needed to design the transformation plan 1300, in order to build the capabilities needed by the specific client organization. The assessment also sequences the components for the value of each of the components, and sequences the components in relationship to the other components.

The phases 1310 include a phase 1312 for laying the foundation; a phase 1314 for building the capability; and, a phase 1316 for maturing the capability. The actions 1320 include an action 1322 for finalizing the scope, launching, and managing the phase 1312. Actions 1324 and 1326 are also provided for finalizing the scope, launching, and managing the phases 1314 and 1316, respectively. The actions steps 1320 are managed as one transformation plan across all of the phases 1310.

The scope 1330 prioritizes the development of the components 210-836 of the CBM 100. For example, in the embodiment illustrated in FIG. 5, the portfolio strategy component 310 has the first priority; and, the IP strategy component 212 has the second priority. The patent quality management component 520 has the third priority; and, the filing strategy component 410 has the fourth priority.

The milestones 1340 identify when the scope 1330 of each of the phases 1312, 1314, and 1316 should be finalized. The milestones 1340 also identify when each of the phases 1312, 1314, and 1316 should be launched. In at least one embodiment, early deployment of some prioritized opportunities is expected. In the embodiment illustrated in FIG. 5, a milestone 1342 indicates that the scope 1330 of the phase 1312 should be finalized in January; and, a milestone 1344 indicates that the phase 1312 should be launched in February. Further, a milestone 1346 indicates that the scope 1330 of the phase 1314 should be finalized in April; and, a milestone 1348 indicates that the phase 1314 should be launched in May. A milestone 1350 indicates that the scope 1330 of the phase 1316 should be finalized in November; and, a milestone 1352 indicates that the phase 1316 should be launched in January of the following year.

Figure 6:
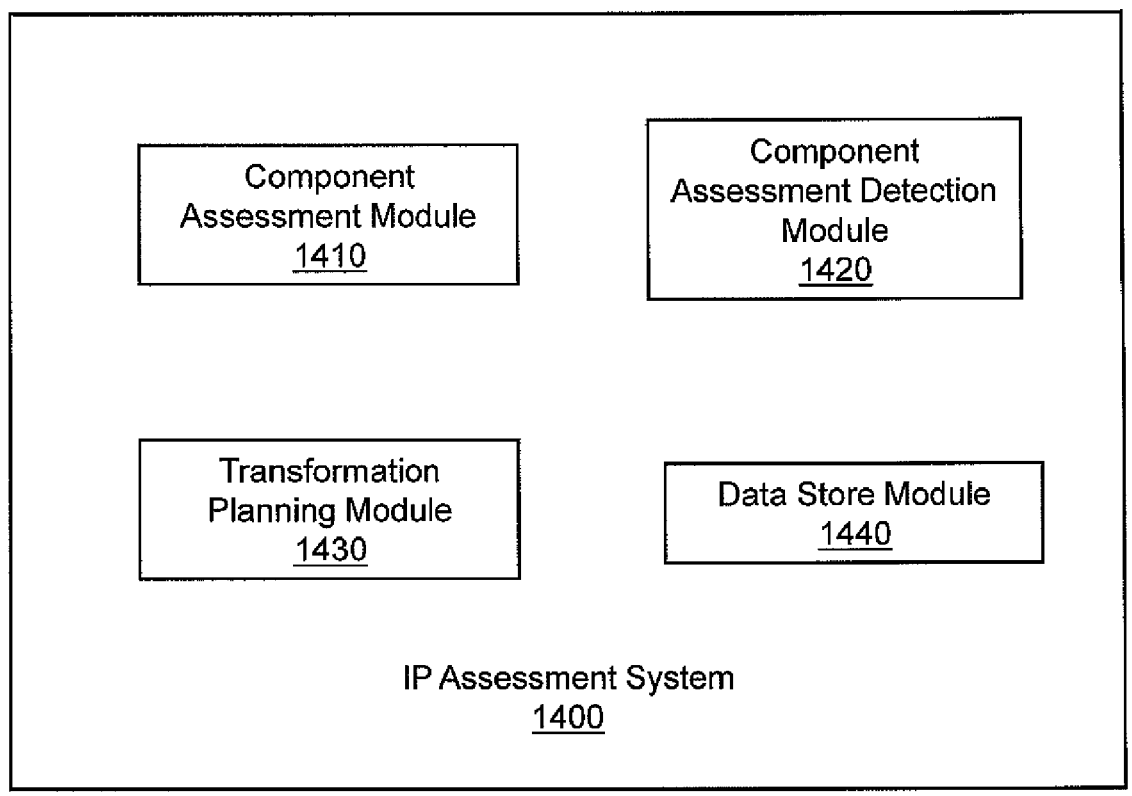
FIG. 6 illustrates an intellectual property assessment system according to an embodiment of the invention.

At least one embodiment includes a computer system and an executable software program or group of programs. More specifically, FIG. 6 illustrates an intellectual property assessment module 1400 including a component assessment module 1410, a component assessment detection module 1420 (also referred to herein as the component detection module), a transformation planning module 1430, and a data store module 1440 according to an embodiment of the invention. The component assessment module 1410 uses software technology to interact with an individual, guiding the individual through a series of questions. The questions may be presented to the individual simultaneously or the questions may be asked in sequence. In at least one embodiment, the questions are accompanied with graphical depictions to help the user understand the question. In another embodiment, multimedia (video and audio) presentations accompany some or all of the questions. Definitions of terms are provided within the software component or may be linked from the software component to an internet web site developed by the service provider.

In one embodiment, the individual obtains help answering the questions through a telephone system, a web based portal in which the help service may review the completed questions, and/or through a desktop remote control system in which the individual discusses the questions with support personal while the support personal controls the individual's keyboard and mouse answering questions within the program for the individual. In another embodiment, the questions are answered by a third party (e.g., a consultant organization) and some of the questions are answered automatically by the software system using network and software exploration tools. In yet another embodiment, databases that contain information about each component (e.g., dollar investment, tools, metrics) are interrogated.

After all of the answers to the questions have been received, the component assessment detection module 1420 is invoked. As described above, in at least one embodiment, the component assessment detection module 1420 includes a scoring unit and an analyzer. The component assessment detection module 1420 uses the data store module 1440 in combination with the answers obtained by the component assessment module 1410 to ascertain if there are issues with a component 210-836. The answer to each question is rated using information stored within the data store module 1440.

In one embodiment, a single question may have 5 possible answers, wherein each answer is worth a specific number of points (e.g., 1 to 5 points). Furthermore, each question has an associated weight, which is used as a multiplier for each question's answer points. Weightings are nonzero and positive. However, they are not required to be integers; and, instead they may be floating point numbers (e.g, 0.23, 1.5). The weightings permit the system to assign more or less value to certain questions, enabling a more precise detection of the components 210-836. The weightings and point assignments for each questions are stored in the data store module 1440. The total points (with weightings) are calculated and the point total is mapped to a level (e.g., low level 1140), which is presented to the individual (e.g., on the heatmap 1100). In one embodiment, the detection may be trained on databases in the component assessment module 1410.

After the component 210-836 is displayed, the transformation planning module 1430 is invoked. The transformation planning module 1430 uses the data store module 1440 in combinations with the results of the component assessment detection module 1420 to present the individual with a list of gaps 1010, duplication 1020, conflicts 1030, and over-investment 1040, along with a plan to correct.

The data store module 1440 permits the storage and retrieval of information. A software product populates the data store module 1440 with the questions for the component assessment module 1410, the point values and weightings used by the component assessment detection module 1420, and the transformation planning module 1430. The storage is nonvolatile, e.g., a hard disk drive or a flash drive. A query component (e.g., a relational database) is used as an interface between the software program and the physical storage. In one embodiment, the query component includes a relational database, e.g., DB2 (available from International Business Machines, Armonk, N.Y., USA). In one embodiment, resource availability and ownership data is provided in the data store module 1440, wherein resources can be automatically assigned to work on the plan provided by the transformation planning module 1430.

Figure 7:
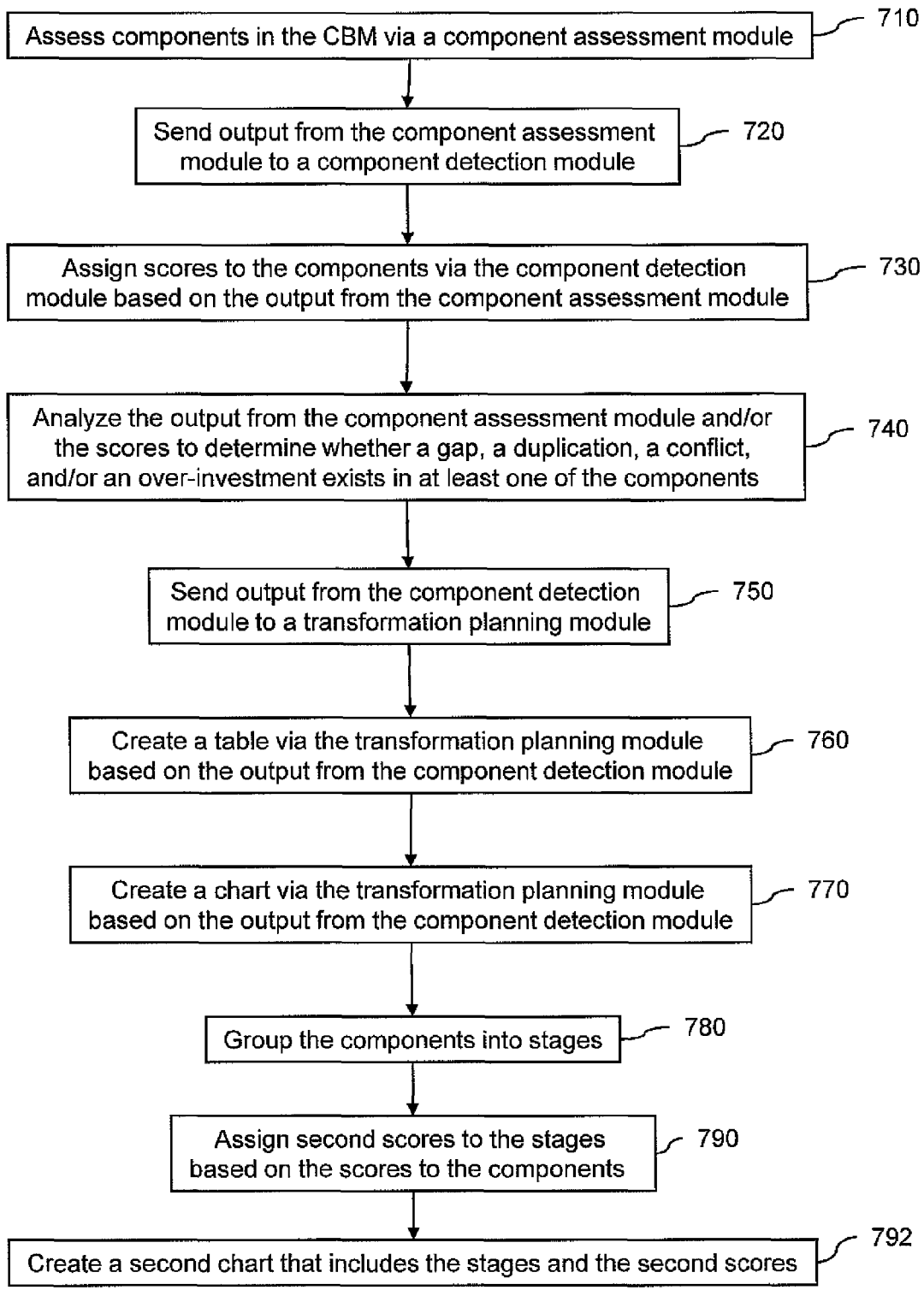
FIG. 7 is a flow diagram illustrating a method for intellectual property assessments according to an embodiment of the invention.

FIG. 7 is a flow diagram illustrating a method 700 for intellectual property assessments according to an embodiment of the invention. The method 700 assesses components in the CBM via a component assessment module (710), which interrogates an entity (e.g., a user, a third party consultant, and an information database) with questions. Output (including answers to the questions) from the component assessment module is sent to a component detection module (720). Scores (e.g., numerical scores and/or low, medium, or high scores) are assigned to the components via the component detection module based on the output from the component assessment module (730).

The output from the component assessment module and/or the scores are analyzed to determine whether a gap, a duplication, a conflict, and/or an over-investment exists in at least one of the components (740). The gap indicates that one or more of the following conditions exists in a component: lacks a capability, lacks a functionality, suffers from a poor design of a functionality, and is misaligned with a strategy of the CBM. Duplication indicates that a component includes a duplicate effort respective to a second component in the CBM in the development, maintenance, and/or production of IP services. The conflict indicates that a component includes a functionality that reduces the functionality of a second component in the CBM. Over-investment indicates that a component includes diminishing returns respective to an overall goal of the CBM.

Output from the component detection module is sent to a transformation planning module (750), wherein the output includes the scores and/or the gap, duplication, conflict, and/or over-investment. A table is created via the transformation planning module based on the output from the component detection module (760). The table displays the components and the gap, duplication, conflict, and/or over-investment. A chart is created via the transformation planning module based on the output from the component detection module (770). The chart includes the components and the scores.

The method further includes grouping the components into stages (e.g., invent stage, IP creation stage, IP administration stage, defend stage, influence stage, and capitalize stage) (780) and assigning second scores (e.g., numerical scores and/or low, medium, or high scores) to the stages based on the scores to the components (790). A second chart is created that includes the stages and the second scores (792).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
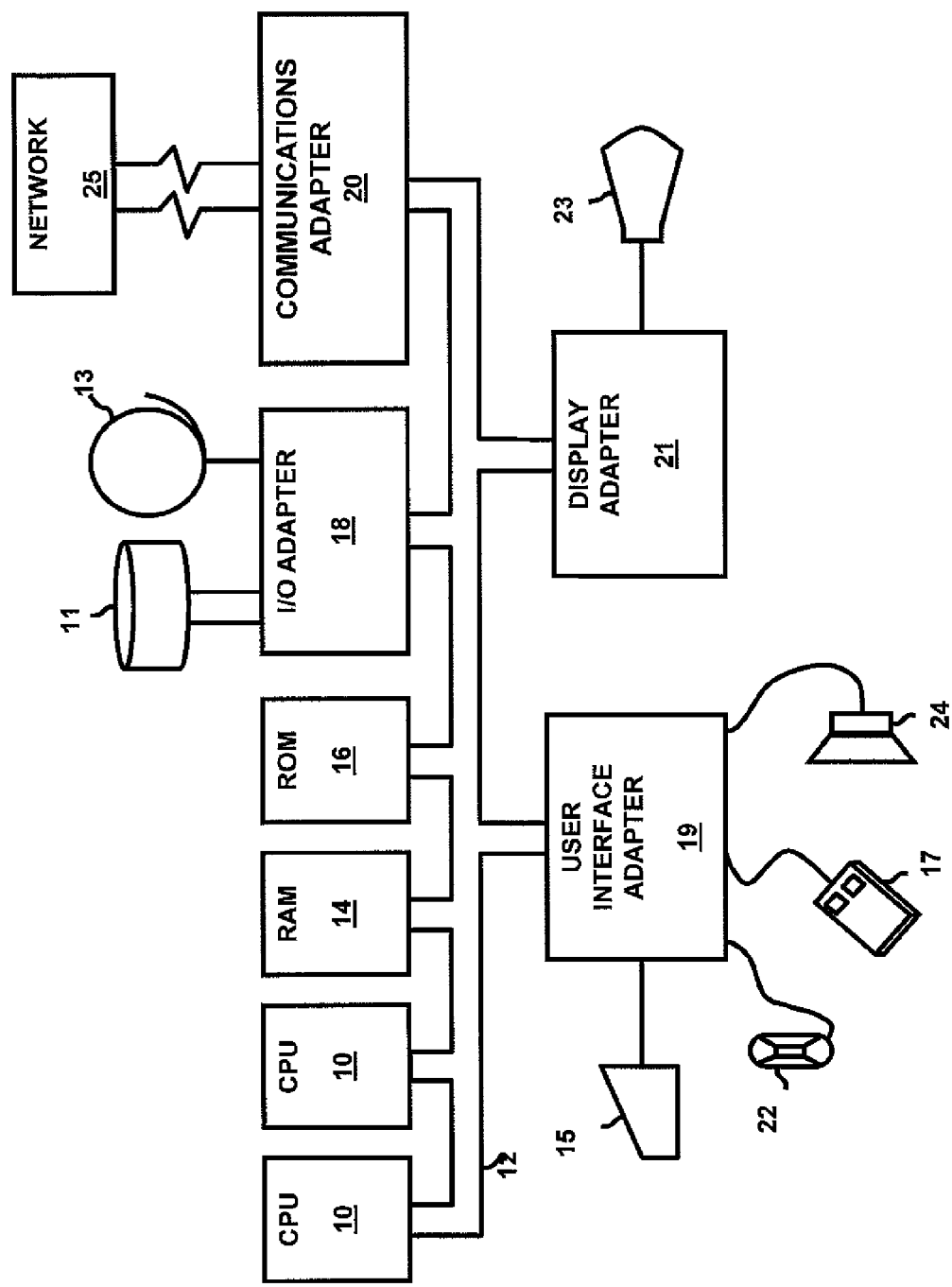
FIG. 8 illustrates a computer program product according to an embodiment of the invention.

Referring now to FIG. 8, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of intellectual property assessment based on a component business model, said method including:

assessing components in said component business model via a component assessment module on a processor, including interrogating an entity with questions;

sending output from said component assessment module to a component detection module on the processor, said output including answers to said questions;

assigning scores to said components via said component detection module based on said output from said component assessment module;

analyzing at least one of said output from said component assessment module and said scores to determine whether at least one of a gap, a duplication, a conflict, and an over-investment exists in at least one component of said components;

sending output from said component detection module to a transformation planning module on the processor, said output including at least one of said scores and said at least one of said gap, said duplication, said conflict, and said over-investment;

creating a table via said transformation planning module based on said output from said component detection module, said table displaying said components and said at least one of said gap, said duplication, said conflict, and said over-investment; and creating a chart via said transformation planning module based on said output from said component detection module, said chart including said components and said scores.

2. The method according to claim 1, wherein said interrogating of said entity is selected from a group consisting of a user, a third party consultant, and an information database.

3. The method according to claim 1, wherein said gap indicates that at least one of the following conditions exists in said at least one component: lacks a capability, lacks a functionality, suffers from a poor design of a functionality, and is misaligned with a strategy of said component business model.

4. The method according to claim 1, wherein said duplication indicates that said at least one component includes a duplicate effort respective to a second component in said component business model in at least one of development, maintenance, and production of IP services.

5. The method according to claim 1, wherein said conflict indicates that said at least one component includes a functionality that reduces a functionality of a second component in said component business model.

6. The method according to claim 1, wherein said over-investment indicates that said at least one component includes diminishing returns respective to an overall goal of said component business model.

7. The method according to claim 1, further comprising:
grouping said components into stages;
assigning second scores to said stages based on said assigning of scores to said components; and
creating a second chart including said stages and said second scores.

8. The method according to claim 7, wherein said grouping of said components includes grouping said components into at least two of an invent stage, an IP creation stage, an IP administration stage, a defend stage, an influence stage, and a capitalize stage.

9. The method according to claim 7, wherein said assigning of said second scores includes assigning at least one of a low score, a medium score, and a high score.

10. The method according to claim 7, wherein said assigning of said second scores includes assigning a numerical score.

11. The method according to claim 1, wherein said assigning of said scores includes assigning at least one of a low score, a medium score, and a high score.

12. The method according to claim 1, wherein said assigning of said scores includes assigning a numerical score.

13. A system for intellectual property assessment based on a component business model, including:
- a component assessment module on a processor for assessing components in said component business model, including an interrogation unit for interrogating an entity with questions;
- a component detection module on said processor for receiving output from said component assessment module, said output including answers to said questions;
- a scoring unit of said component detection module for assigning scores to said components based on said output from said component assessment module;
- an analyzer of said component detection module for determining whether at least one of a gap, a duplication, a conflict, and an over-investment exists in at least one component of said components based on at least one of said output from said component assessment module and said scores;
- a transformation planning module on said processor for receiving output from said component detection module, said output including at least one of said scores and said at least one of said gap, said duplication, said conflict, and said over-investment;
- a table created by said transformation planning module based on said output from said component detection module, said table displaying said components and said at least one of said gap, said duplication, said conflict, and said over-investment; and
- a chart created by said transformation planning module based on said output from said component detection module, said chart including said components and said scores.

14. The system according to claim 13, wherein said entity includes at least one of a user, a third party consultant, and an information database.

15. The system according to claim 13, wherein said gap indicates that at least one of the following conditions exists in said at least one component: lacks a capability, lacks a functionality, suffers from a poor design of a functionality, and is misaligned with a strategy of said component business model.

16. The system according to claim 13, wherein said duplication indicates that said at least one component includes a duplicate effort respective to a second component in said component business model in at least one of development, maintenance, and production of IP services.

17. The system according to claim 13, wherein said conflict indicates that said at least one component includes a functionality that reduces a functionality of a second component in said component business model.

18. The system according to claim 13, wherein said over-investment indicates that said at least one component includes diminishing returns respective to an overall goal of said component business model.

19. The system according to claim 13, wherein said transformation planning module groups said components into stages, assigns second scores to said stages based on said assigning of scores to said components, and creates a second chart including said stages and said second scores.

20. The system according to claim 19, wherein said stages include at least two of an invent stage, an IP creation stage, an IP administration stage, a defend stage, an influence stage, and a capitalize stage.

21. The system according to claim 19, wherein said second scores include at least one of a low score, a medium score, and a high score.

22. The system according to claim 19, wherein said second scores include a numerical score.

23. The system according to claim 13, wherein said scores includes at least one of a low score, a medium score, and a high score.

24. The system according to claim 13, wherein said scores include a numerical score.

25. A program storage device readable by computer, tangibly embodying a program of instructions executable by said computer to perform a method of intellectual property assessment based on a component business model, said method comprising:
- assessing components in said component business model via a component assessment module, including interrogating an entity with questions;
- sending output from said component assessment module to a component detection module, said output including answers to said questions;
- assigning scores to said components via said component detection module based on said output from said component assessment module;
- identifying at least one of a gap, a duplication, a conflict, and an over-investment in at least one component of said components based on at least one of said output from said component assessment module and said scores;
- sending output from said component detection module to a transformation planning module, said output including said scores and said identifying of said at least one of said gap, said duplication, said conflict, and said over-investment;
- creating a table via said transformation planning module based on said output from said component detection module, said table displaying said components and said at least one of said gap, said duplication, said conflict, and said over-investment; and
- creating a chart via said transformation planning module based on said output from said component detection module, said chart including said components and said scores,
- said component assessment module, said component detection module, and said transformation planning module are executable on said computer.

* * * * *